US012574153B2

(12) United States Patent
Wen et al.

(10) Patent No.: US 12,574,153 B2
(45) Date of Patent: Mar. 10, 2026

(54) REPETITION SCHEME FOR TRANSMISSION

(71) Applicant: Nokia Technologies Oy, Espoo (FI)

(72) Inventors: Pingping Wen, Shanghai (CN); Ping Yuan, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 314 days.

(21) Appl. No.: 18/260,313

(22) PCT Filed: Jan. 14, 2021

(86) PCT No.: PCT/CN2021/071943
§ 371 (c)(1),
(2) Date: Jul. 3, 2023

(87) PCT Pub. No.: WO2022/151285
PCT Pub. Date: Jul. 21, 2022

(65) Prior Publication Data
US 2024/0089033 A1     Mar. 14, 2024

(51) Int. Cl.
*H04L 1/08*     (2006.01)
*H04W 74/00*     (2009.01)

(52) U.S. Cl.
CPC ............. *H04L 1/08* (2013.01); *H04W 74/002* (2013.01)

(58) Field of Classification Search
CPC ............................ H04B 17/27; H04B 17/309; H04B 17/18563; H04B 17/346; H04B 17/347;
(Continued)

(56) References Cited

U.S. PATENT DOCUMENTS

2017/0230780 A1     8/2017     Chincholi et al.
2018/0077722 A1*     3/2018     Awad ................ H04W 72/0446
(Continued)

FOREIGN PATENT DOCUMENTS

CN     107241172 A     10/2017
CN     104812082 B     4/2019
(Continued)

OTHER PUBLICATIONS

Office Action received for corresponding Indian Patent Application No. 202317046908, dated Jan. 9, 2025, 6 pages.
(Continued)

*Primary Examiner* — Stephen J Clawson
(74) *Attorney, Agent, or Firm* — Carter, DeLuca & Farrell LLP

(57)     ABSTRACT

Example embodiments of the present disclosure relate to repetition solution for transmission. In such solution, a first device determines information associated with a movement direction of a second device serving the first device relative to the first device. Then, the first device performs a transmission of the information to the second device. With this solution, repetition number is able to be selected/determined at both the first device and the second device based on the information such as change trend of pathloss/RSRP, the change trend of RSRP of a signal received from the second device, the change trend of a distance between the first device and the second device, the change trend of an elevation angle between the first device and the second device, the change trend of a SINR of a signal received from the second device, the change trend of RSRQ of a signal received from the second device, the change trend of a Doppler shift of a signal received from the second device, or elevation angle of the second device, thereby optimizing the resource usage of the network and reducing the transmission
(Continued)

time as well as the power consumption for the first device or reducing the failure of the transmission.

1 Claim, 7 Drawing Sheets

(58) Field of Classification Search
CPC ...... H04L 1/08; H04W 16/18; H04W 64/006; H04W 74/002; H04W 84/005
See application file for complete search history.

(56) References Cited

U.S. PATENT DOCUMENTS

| | | | | |
|---|---|---|---|---|
| 2018/0176847 A1* | 6/2018 | Fasil Abdul | ...... | H04W 36/0061 |
| 2019/0075503 A1* | 3/2019 | Bae | ...... | H04W 52/48 |
| 2019/0150218 A1 | 5/2019 | Futaki | | |
| 2020/0068619 A1* | 2/2020 | Kim | ...... | H04W 74/004 |
| 2020/0344816 A1 | 10/2020 | Sha et al. | | |

FOREIGN PATENT DOCUMENTS

| | | |
|---|---|---|
| CN | 110912629 A | 3/2020 |
| EP | 3411974 B1 | 11/2020 |
| WO | 2019/161044 A1 | 8/2019 |
| WO | 2019/216706 A1 | 11/2019 |
| WO | 2020/198671 A1 | 10/2020 |
| WO | 2020/204421 A1 | 10/2020 |

OTHER PUBLICATIONS

Extended European Search Report received for corresponding European Patent Application No. 21918493.4, dated Sep. 13, 2024, 10 pages.
"3rd Generation Partnership Project; Technical Specification Group Radio Access Network; NR; Medium Access Control (MAC) protocol specification (Release 16)", 3GPP TS 38.321, V16.2.1, Sep. 2020, pp. 1-154.

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.
"Third Generation Partnership Project (3GPP™)", 3GPP TSG RAN meeting #87e, RP-200478, Meeting Report for TSG RAN meeting #86, Mar. 16-19, 2020, pp. 1-217.
"New Study WID on NB-IoT/eTMC support for NTN", 3GPP TSG RAN Meeting #86, RP-193235, Agenda: xxx, Media Tek Inc, Dec. 9-31, 2019, 4 pages.
"3rd Generation Partnership Project; Technical Specification Group Radio Access Network; Study on New Radio (NR) to support non terrestrial networks (Release 15)", 3GPP TR 38.811, V15.0.0, Jun. 2018, pp. 1-118.
"3rd Generation Partnership Project; Technical Specification Group Radio Access Network; Solutions for NR to support non-terrestrial networks (NTN) (Release 16)", 3GPP TR 38.821, V16.0.0, Dec. 2019, pp. 1-40.
"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321, V15.10.0, Sep. 2020, pp. 1-134.
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.11.0, Sep. 2020, pp. 1-965.
"IEEE 802.11", Wikipedia, Retrieved on Jul. 21, 2023, Webpage available at : https://en.wikipedia.org/wiki/IEEE_802.11.
International Search Report and Written Opinion received for corresponding Patent Cooperation Treaty Application No. PCT/CN2021/071943, dated Oct. 20, 2021, 9 pages.
"Discussion on timing advance and RACH for NTN", 3GPP TSG RAN WG1 Meeting #98-Bis, R1-1910864, Agenda: 7.2.5.3, PCL, Oct. 14-18, 2019, 4 pages.
"Summary #2 of 8.4.4 Other Aspects of NR-NTN", 3GPP TSG RAN WG1 Meeting #103e, R1-2009487, Agenda: 8.4.4, MediaTek Inc, Oct. 26-Nov. 13, 2020, 39 pages.

* cited by examiner

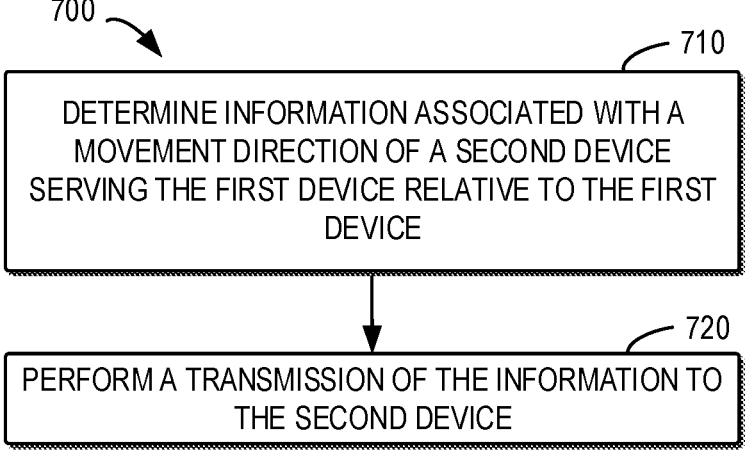

700

710

DETERMINE INFORMATION ASSOCIATED WITH A MOVEMENT DIRECTION OF A SECOND DEVICE SERVING THE FIRST DEVICE RELATIVE TO THE FIRST DEVICE

720

PERFORM A TRANSMISSION OF THE INFORMATION TO THE SECOND DEVICE

Fig. 7

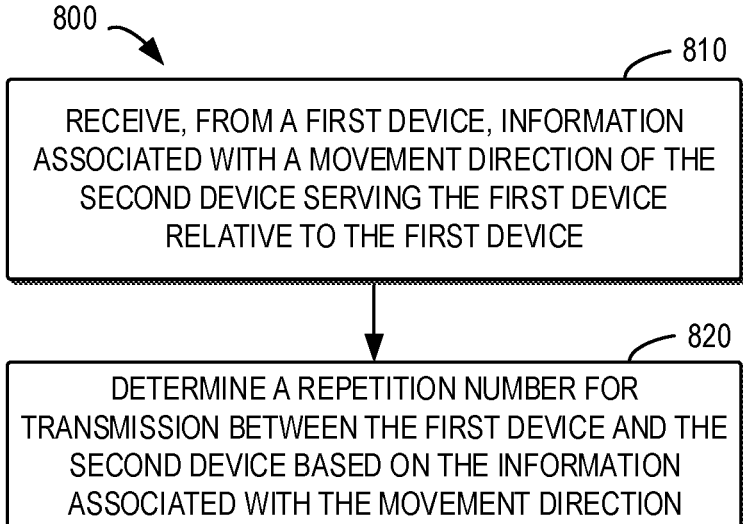

800

810

RECEIVE, FROM A FIRST DEVICE, INFORMATION ASSOCIATED WITH A MOVEMENT DIRECTION OF THE SECOND DEVICE SERVING THE FIRST DEVICE RELATIVE TO THE FIRST DEVICE

820

DETERMINE A REPETITION NUMBER FOR TRANSMISSION BETWEEN THE FIRST DEVICE AND THE SECOND DEVICE BASED ON THE INFORMATION ASSOCIATED WITH THE MOVEMENT DIRECTION

REPETITION SCHEME FOR TRANSMISSION

RELATED APPLICATION

This application was originally filed as PCT Application No. PCT/CN2021/071943, filed on Jan. 14, 2021, which is incorporated herein by reference in its entirety.

FIELD

Embodiments of the present disclosure generally relate to the field of telecommunication and in particular, to methods, devices, apparatuses and computer readable storage medium for a repetition scheme for transmission.

BACKGROUND

With developments of communication systems, new technologies have been proposed. 3rd generation partnership project (3GPP) has agreed a study item on narrow band Internet of things (NB-IoT) or enhanced machine-type communication (eMTC) support for non-terrestrial network, so as to provide IoT operation is in remote areas with low or no cellular connectivity for many different industries, including for example, transportation (maritime, road, rail, air) & logistics, solar, oil & gas harvesting, utilities, farming, environment monitoring, mining, and the like.

Satellite NB-IoT or eMTC can be in a complementary manner to terrestrial deployments in which satellite connectivity can provide coverage beyond terrestrial deployments. Solutions are under discussion for NB-IoT and eMTC over NTN with minimum necessary specifications.

SUMMARY

In general, example embodiments of the present disclosure provide a solution for repetition scheme for transmission. Embodiments that do not fall under the scope of the claims, if any, are to be interpreted as examples useful for understanding various embodiments of the disclosure.

In a first aspect, there is provided a first device. The first device comprises at least one processor; and at least one memory including computer program code; where the at least one memory and the computer program code are configured to, with the at least one processor, cause the first device to determine information associated with a movement direction of a second device serving the first device relative to the first device; and perform a transmission of the information to the second device.

In a second aspect, there is provided a second device. The second device comprises at least one processor; and at least one memory including computer program code; where the at least one memory and the computer program code are configured to, with the at least one processor, cause the second device to receive, from a first device, information associated with a movement direction of the second device serving the first device relative to the first device; and determine a repetition number for transmission between the first device and the second device based on the information associated with the movement direction.

In a third aspect, there is provided a method. The method comprises determining, at a first device, information associated with a movement direction of a second device serving the first device relative to the first device; and performing a transmission of the information to the second device.

In a fourth aspect, there is provided a method. The method comprises receiving, at a second device and from a first device, information associated with a movement direction of the second device serving the first device relative to the first device; and determining a repetition number for transmission between the first device and the second device based on the information associated with the movement direction.

In a fifth aspect, there is provided a first apparatus. The first apparatus comprises means for determine information associated with a movement direction of a second device serving the first device relative to the first device; and means for performing a transmission of the information to the second device.

In a sixth aspect, there is provided a second apparatus. The second apparatus comprises means for receiving, from a first device, information associated with a movement direction of the second device serving the first device relative to the first device; and means for determining a repetition number for transmission between the first device and the second device based on the information associated with the movement direction.

In a seventh aspect, there is provided a computer readable medium. The computer readable medium comprises program instructions for causing an apparatus to perform at least the method according to any of the third aspect and the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 7 illustrates a flowchart of a process implemented at a first device according to some example embodiments of the present disclosure;

FIG. 8 illustrates a flowchart of a process implemented at a second device according to some example embodiments of the present disclosure;

Throughout the drawings, the same or similar reference numerals represent the same or similar element.

DETAILED DESCRIPTION

Figure 1:
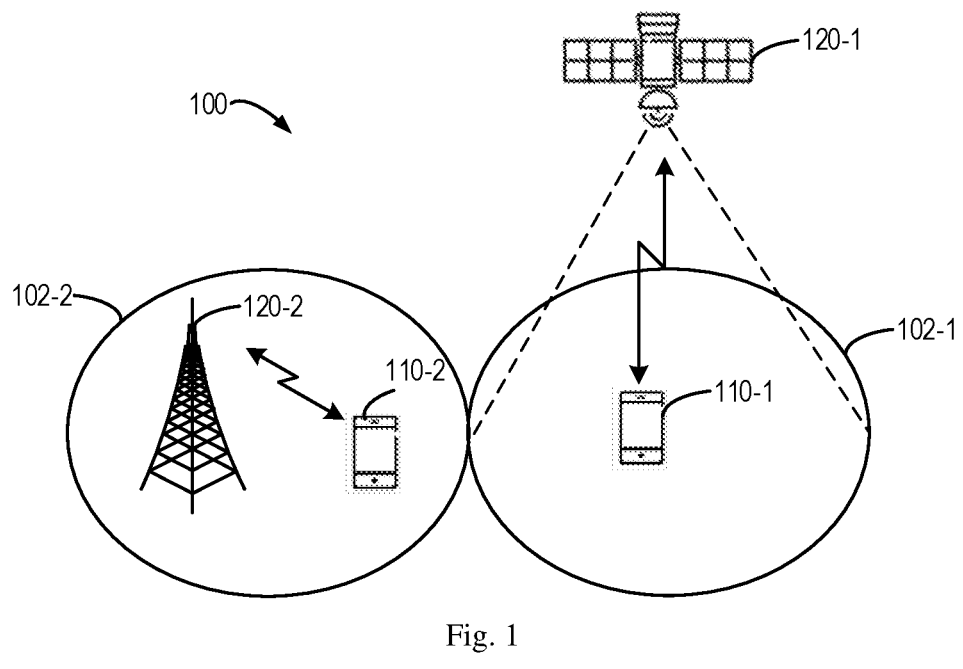
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as new radio (NR), long term evolution (LTE), LTE-advanced (LTE-A), wideband code division multiple access (WCDMA), high-speed packet access (HSPA), narrow band Internet of things (NB-IoT), eMTC, non-terrestrial network (NTN) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the future sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a remote radio unit (RRU), a radio header (RH), a remote radio head (RRH), a relay, an Integrated access and backhaul (IAB) node, a low power node such as a femto, a pico, a non-terrestrial network (NTN) or non-ground network device such as a satellite network device, a low earth orbit (LEO) satellite, a medium earth orbit (MEO) satellite and a geosynchronous earth orbit (GEO) satellite, an aircraft network device, and so forth, depending on the applied terminology and technology. In some example embodiments, radio access network (RAN) split architecture comprises a centralized unit (CU) and a distributed unit (DU) at an IAB donor node. An IAB node comprises a mobile terminal (IAB-MT) part that behaves like a UE toward the parent node, and a DU part of an JAB node behaves like a base station toward the next-hop IAB node.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a mobile termination (MT) part of an IAB node (e.g., a relay node). In the following description, the terms "terminal device", "communication device", "terminal", "user equipment" and "UE" may be used interchangeably.

As used herein, the term "determining" (and grammatical variants thereof) can include, not least: calculating, computing, processing, deriving, measuring, investigating, selecting, identifying, looking up (e.g., looking up in a table, a database or another data structure), ascertaining and the like. Also, "determining" can include receiving (e.g., receiving information), accessing (e.g., accessing data in a memory), obtaining and the like. Also, "determining" can include resolving, selecting, choosing, establishing, and the like.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some example embodiments of the present disclosure. It is noted that example embodiments of the present disclosure are equally applicable to other resources in other domains.

FIG. 1 illustrates an example communication environment 100 in which example embodiments of the present disclosure can be implemented. In the example of FIG. 1, two types of communication networks are shown, including a non-terrestrial network (NTN) or non-ground network with one or more NTN network devices or non-ground network devices for providing communication coverage, and a terrestrial network (TN) or ground network with one or more terrestrial or ground network devices for providing communication coverage. In the following, a NTN is referred to as a NTN network and a TN is referred to as a TN network in order to improve the readability although "network" is redundant.

In the NTN network, a first device 110-1 and a second device 120-1 can communicate with each other. In this example, the first device 110-1 is illustrated as a terminal device, and the second device 120-1 is illustrated as a NTN network device (e.g., a satellite) serving the terminal device. However, it should be appreciated that, in the NTN deployment, there are two possible scenarios. In one scenario, the second device 120 (e.g., the second device 120-1) may be implemented in or as a satellite. For example, the second device 120 is on-board in the satellite, and thus may be referred to as a satellite network device. In another scenario, a second device 120-2 may be on the ground. In such scenario, the satellite is as a relay and the second device 120-2 is on the ground.

The serving area of the second device 120-1 is called as a cell 102-1. In the TN network, a first device 110-2 and a second device 120-2 can communicate with each other. In this example, the first device 110-2 is illustrated as a terminal device, and the second device 120-2 is illustrated as a TN network device serving the terminal device. The serving area of the second device 120-2 is called as a cell 102-2. For convenience of discussion, in the following, the first devices 110-1 and 110-2 are collectively or individually referred to as first devices 110, the second devices 120-1 and 120-2 are collectively or individually referred to as second devices 120, the cells 102-1 and 102-2 are collectively or individually referred to as cells 102.

It is to be understood that the number of first and second devices is only for the purpose of illustration without suggesting any limitations. The communication environment 100 may include any suitable number of devices adapted for implementing embodiments of the present disclosure. Although not shown, it would be appreciated that one or more additional devices may be located in the cell 102, and one or more additional cells may be deployed in the environment 100. It is noted that although illustrated as a network device, the second device 120 may be other device than a network device. Although illustrated as a terminal device, the first device 110 may be other device than a terminal device.

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G) and the sixth generation (6G) and on the like, wireless local network communication protocols such as institute for electrical and electronics engineers (IEEE) 802.11 and the like, and/or any other protocols currently known or to be developed in the future. Moreover, the communication may utilize any proper wireless communication technology, comprising but not limited to: code division multiple access (CDMA), frequency division multiple access (FDMA), time division multiple access (TDMA), frequency division duplex (FDD), time division duplex (TDD), multiple-input multiple-output (MIMO), orthogonal frequency division multiple (OFDM), discrete Fourier transform spread OFDM (DFT-s-OFDM) and/or any other technologies currently known or to be developed in the future.

In the communication environment 100, the first device 110 and the second device 120 may communicate data and control information to each other. In the case that the first device 110 is a terminal device and the second device 120 is a network device, a link from the second device 120 to the first device 110 is referred to as a downlink (DL), while a link from the first device 110 to the second device 120 is referred to as an uplink (UL). In DL, the second device 120 is a transmitting (TX) device (or a transmitter) and the first device 110 is a receiving (RX) device (or a receiver). In UL, the first device 110 is a TX device (or a transmitter) and the second device 120 is a RX device (or a receiver). In another scenario that a second device 120-2 may be on the ground, there is also one or more feeder links between the satellite and a second device 120-2 on the ground Coverage enhancement (CE) is one feature for NB-IoT networks, which can be achieved with the help of the narrower carrier bandwidth and the repetition transmission.

Figure 2A:
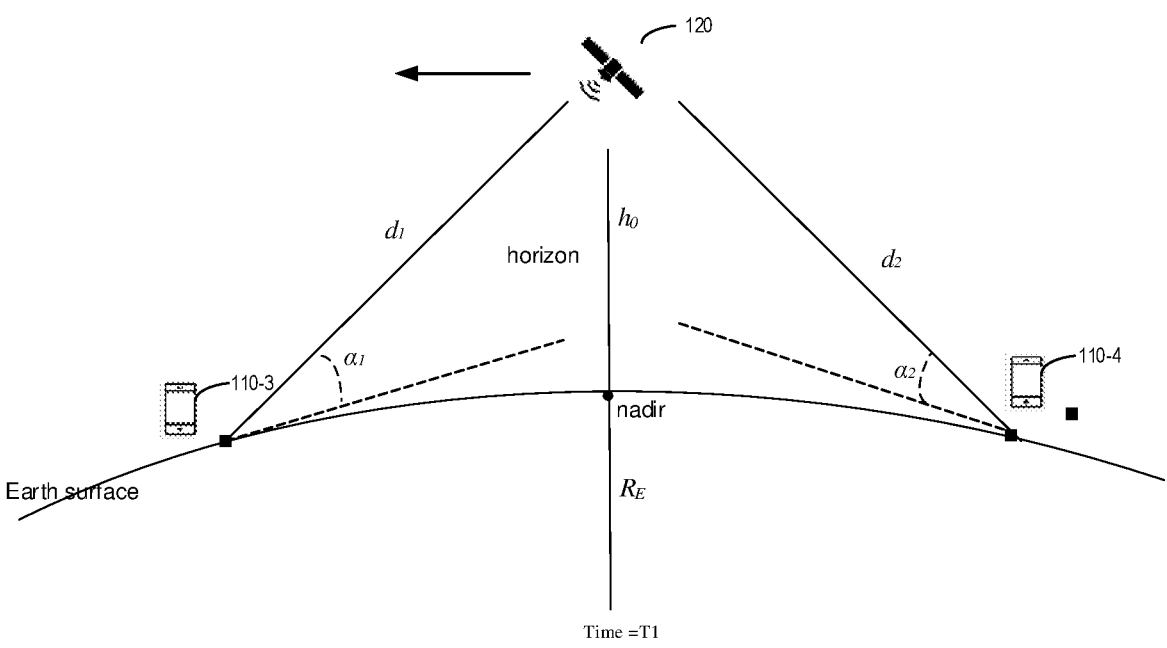
FIGS. 2A-2C illustrate pathloss change with the movement of satellite according to some example embodiments of the present disclosure.
Figure 2B:
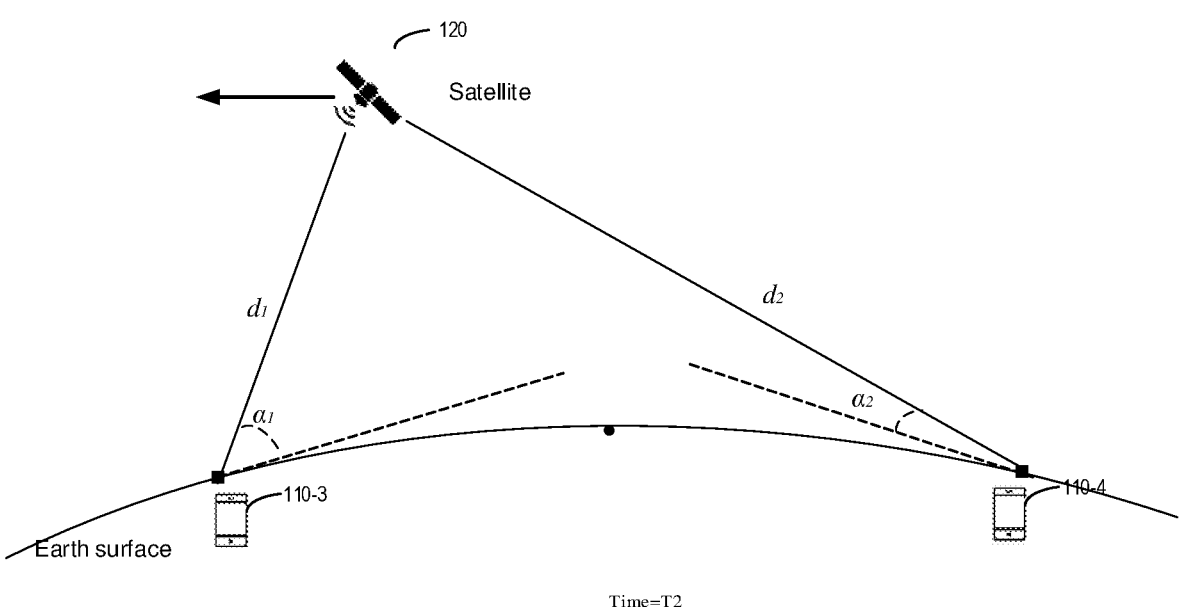
Figure 2C:
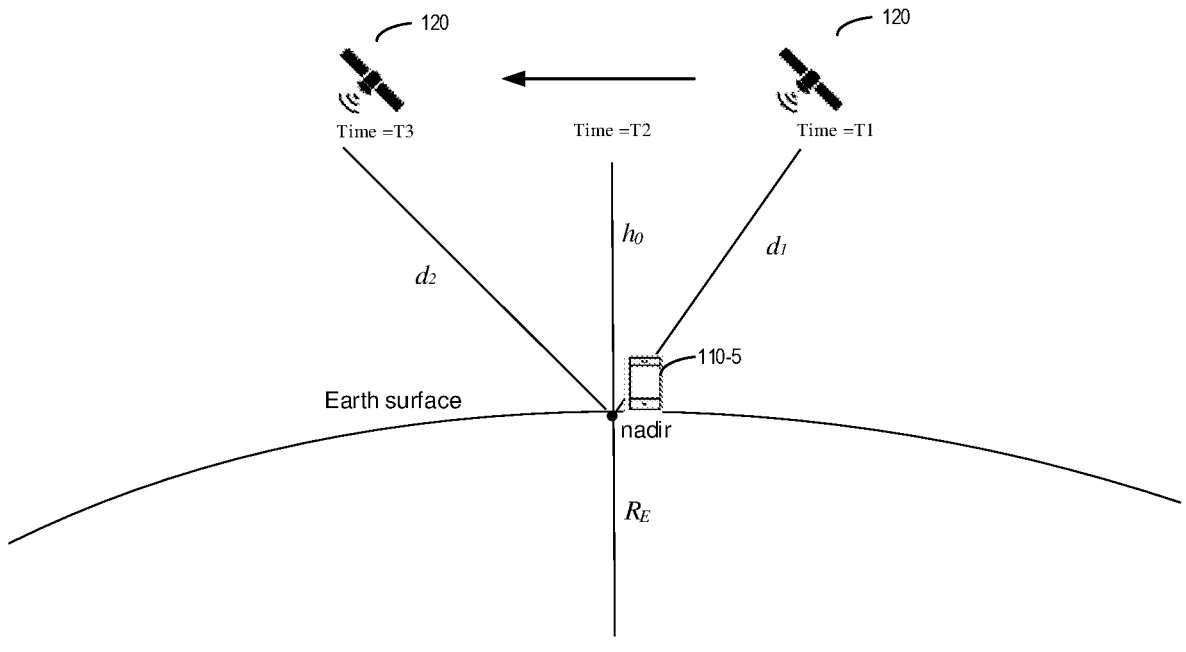

To support various traffic with different coverage conditions, each second device 120 (e.g., a base station (BS)) defines three coverage groups that have different ranges measured reference signal received power (RSRP). The second device 120 can configure the reference signal received power (RSRP) threshold for the first device 110 to select the coverage level. Each coverage level will be configured with one NB-IoT physical random access channel (NPRACH) parameter configuration including the number of repetitions required for preamble transmission and the maximum number of repetitions for NPDCCH common search space (CSS). As such, the second device 120 can configure up to three NPRACH parameter configurations in a cell correspondingly. In each NPRACH parameter configuration, a repetition value is specified for repeating a basic random access preamble in MSG1 during random access procedure and the maximum number of repetitions for NPDCCH common search space (CSS) is specified for Msg2, Msg3 retransmissions and Msg4 during random access procedure. The first device 110 measures its downlink received signal power to obtain RSRP and compares its received signal power with configured RSRP thresholds corresponding to the PRACH configurations, so as to determine (or select or identify) the first device 110's coverage level. Then the repetition number configured for the coverage level can be selected, such that the number of repetitions for transmitting preamble and the maximum number of repetitions for NPDCCH common search space (CSS) for Msg2, Msg3 retransmissions and Msg4 is able to be selected. Accordingly, the first device 110 transmits a random access preamble and re-transmission Msg3 as well as receive Msg2 and Msg 4 with the NPRACH parameters configured for its estimated coverage level including the repetition number However, there are some problems if the traditional preamble repetition scheme is directly applied to the NB-IoT first device 110 in NTN due to the moving characteristics of non-geostationary orbits (NGEOs) satellite system. Satellites in non-geostationary orbits (NGEOs) move with high speed. FIGS. 2A-2C illustrate pathloss change with extremely the movement of satellite according to some example embodiments of the present disclosure. As shown in FIGS. 2A-2C, the distances and pathloss between the second device 120 (e.g., a satellite) and the first device 110-3 or 110-4 (e.g., UEs) are continuously changing, respectively. The first device 110 with the same RSRP which is located at different position will have different pathloss change. When the second device 120 is moving away from the first device 110-4, the change of pathloss is positive. When the second device 120 is moving towards the first device 110-3, the change of pathloss is negative. As shown in FIG. 2A, the first device 110-3 and first device 110-4 have the same distance to the second device 120 at the T1 (e.g., d1=d2), thus the pathloss between the second device 120 and the first devices 110-3 and 110-4 are the same. At T2, as shown in FIG. 2B, the distance between first device 110-3 and the second device 120 becomes smaller (i.e., the pathloss between first device 110-3 and the second device 120 becomes smaller) and the distance between first device 110-4 and the second device 120 becomes larger (i.e., the pathloss between first device 110-4 and the second device 120 becomes larger). If the first devices 110-3 and 110-4 estimate the coverage level based on the measured RSRP, for example, at T1, the pathloss/RSRP and the coverage level may be changed with the movement of the second device 120, for example, at T2, and the repetition number is not suitable. For example, if the first device 110-3 selects the coverage level based on the measured RSRP, for example, at T1 and the pathloss becomes smaller with the movement of the second device 120 at T2. As a result, the required repetition number may be not need to be so large since the channel condition becomes better. In this case, the resource may be wasted and the power consumption will be large due to the large number of repetition. Further, if a first device 110-4 select the coverage level based on the measured RSRP, for example, at T1 and the pathloss become larger with the movement of the second device 120, thus the required repetition number may be increased since the channel condition becomes worse. In this case, the transmission is possible not to be decoded correctly and retransmission maybe needed. If the second device 120 can configure the repetition number considering both the measured RSRP (i.e., the coverage level) as well as the pathloss changes with the movement of the second device 120, that is, the first device 110 select the RACH resources as well as the repetition number based on both the measured RSRP (i.e, the coverage level) as well as the pathloss changes with the movement of the second device 120, the resources usage efficiency can be optimized and the first device 110's power consumption can also be saved.

Furthermore, on top of the change trend of RF condition (increase or decrease), there is another case where the radio frequency condition is not changed in a particular direction (i.e. not purely increase or decrease). For example, as show in FIG. 2C, the first device 110 may experience pathloss decrease first (from T1 to T2) and then increase (from T2 to T3). Accordingly, purely increase or decrease repetition number cannot be applied in this case. In this case, three trends (increase, decrease, flat) should be considered and the repetition number can be decided accordingly.

In order to solve at least part of the above mentioned problems, solutions on repetition scheme is provided. According to some example embodiments of the present disclosure, there is provided an improved solution. In this solution, the first device 110 determines information associated with a movement direction of a second device serving the first device relative to the first device. Then the first device 110 transmits the information to the second device 120. Through this solution, repetition number is able to be selected/determined at both the first device 110 and the second device 120 based on the information such as the change trend of pathloss, the change trend of RSRP of a signal received from the second device 120, the change trend of a distance between the first device 110 and the second device 120, the change trend of an elevation angle between the first device and the second device, the change trend of a SINR of a signal received from the second device 120, the change trend of RSRQ of a signal received from the second device 120, the change trend of a Doppler shift of a signal received from the second device 120, or elevation angle between the first device 110 and the second device 120, thereby optimizing the resource usage of the network and reducing the transmission time as well as the power consumption for the first device 110.

Figure 3:
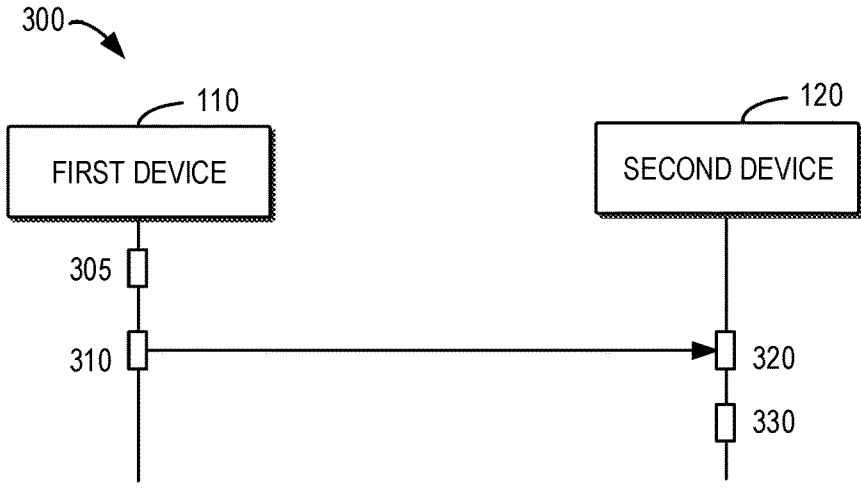
FIG. 3 illustrates a signaling flow according to some example embodiments of the present disclosure.

Example embodiments of the present disclosure will be described in detail below with reference to the accompanying drawings. Reference is now made to FIG. 3, which shows a signaling flow 300 according to some example embodiments of the present disclosure. For the purpose of discussion, the signaling flow 300 will be described with reference to FIG. 1. The signaling flow 300 involves the first device 110 and the second device 120 as illustrated in FIG. 1.

It should be appreciate that the following embodiments are not limited to the NTN-IoT and eMTC networks and can be applicable to any communication networks. For example, the signaling flow 300 may involve the first device 110-1 and the second device 120-1 or may involve the first device 110-2 and the second device 120-2 in the communication environment 100 as illustrated in FIG. 1.

As shown in FIG. 3, the first device 110 determines 305 information associated with a movement direction of the second device 120 serving the first device 110 relative to the first device 110.

In some embodiments, the information associated with a movement direction of the second device 120 may be the change trend of the path loss between the first device 110 and the second device 120. In some other examples, the information associated with a movement direction of the second device 120 may also be the change trend of reference signal received power (RSRP) of signal received from the second device 120, the change trend of distance between the first device 110 and the second device 120, the change trend of an elevation angle between the first device 110 and the second device 120, the change trend of a signal-to-interference-plus-noise ratio, SINR, of a signal received from the second device 120, the change trend of a reference signal received quality, RSRQ of a signal received from the second device 120, or the change trend of Doppler shift of a signal received from the second device 120, and the like. It should be appreciated that, although the change trend of pathloss/RSRP or the like are used as examples, it is just for the purpose of illustration. The change trend may also include the change trend of mentioned in this paragraph or the like, the scope of the present disclosure is not limited in this regard.

In some other embodiments, the information associated with the movement direction of the second device 120 may be an elevation angle of the first device 110 toward the second device 120, as shown in FIG. 2A. The elevation angle may be in a range of $\{-90°, 90°\}$. An elevation angle with positive value means that the second device 120 is moving towards the first device 110 (i.e., the distance between the first device 110 and the second device 120 becomes shorter). In one example, the elevation angle (i.e., $\alpha_1$) of the first device 110-3 towards the second device 120-2 shown in FIG. 2A is with a positive value. While an elevation angle with negative value means that the second device 120 is moving away from the first device 110 (i.e., the distance between the first device 110 and the second device 120 becomes longer). As an example, the elevation angle (i.e., $\alpha_2$) of the first device 110-4 towards the second device 120-2 shown in FIG. 2A is with a negative value.

After determining the information associated with the movement direction, the first device 110 transmits 310 the information associated with the movement direction to the second device 120. Upon receiving 320 the information, the second device 120 determines 330 a repetition number for transmission between the first device 110 and the second device 120 based on the information associated with the movement direction.

Accordingly, the repetition number for transmission is able to be determined by the second device 120's by considering the information associated with the movement direction of the second device relative to the first device 110 for future transmission. Meanwhile, the repetition number for transmission (e.g., for preamble transmission, Msg 2, Msg 3 retransmission and Msg 4 transmission) is also able to be selected by the second device 120's by considering the information associated with the movement direction of the second device 120 relative to the first device 110 as well. As a result, resource will not be wasted and power consumption will be saved during repetitive transmissions, and the transmission time is also reduced. Meanwhile, the likelihood of RACH failure and data transmission failure is reduced.

Figure 4:
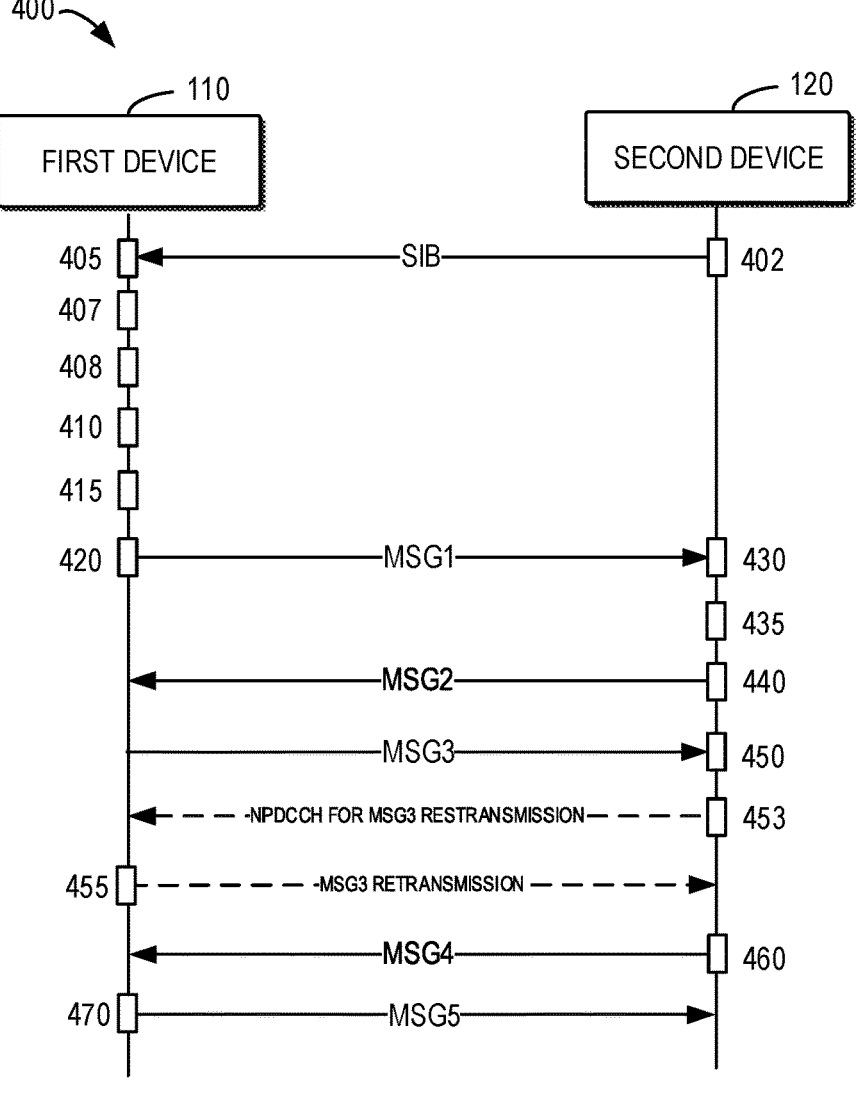
FIG. 4 illustrates a signaling flow according to some example embodiments of the present disclosure.

In the following part, two concrete signal flows according to some example embodiments of the present disclosure will be discussed with reference to FIGS. 4 and 5. FIG. 4 illustrates a signaling flow according to some example embodiments of the present disclosure. For the purpose of discussion, the signaling flow 400 will be described with reference to FIG. 1. The signaling flow 400 involves the first device 110 and the second device 120 as illustrated in FIG. 1.

As shown in FIG. 4, in some embodiments, the second device 120 may transmit 402 a set of parameter configurations to the first device 110 via system information block (SIB). In such embodiments, each parameter configuration in the set of parameter configurations may include corresponding information associated with the movement direction and a repetition number for transmission. In the following part, some example embodiments on how the parameter configuration may be configured will be introduced.

It should be appreciated that, in some embodiments, the second device 120 may also transmit a plurality of sets of parameter configurations to the first device 110 via SIB. The scope of the present disclosure is not limited in this regard.

In one example embodiment, the second device 120 may configure up to N*2 resource configurations which are mapped into N cell coverage level and two change trend of pathloss/RSRP of the first device 110 in a cell. In such example, each parameter configuration may include a corresponding repetition number. The first device 110 with different coverage level and change trend of pathloss/RSRP will select the corresponding parameters for transmission (e.g., for transmitting the preamble, Msg 2, Msg 3 retransmission or Msg 4) using the corresponding repetition number.

The following part shows an example in which the second device 120 may configure up to N*2 parameter configurations which are mapped into N cell coverage level and the two change trend of pathloss/RSRP of the UE in a cell. In this example, the configuration may also include a list of RSRP thresholds list for PRACH, and/or a list of distance thresholds for PRACH. Meanwhile, it also includes a list of parameters for NPRACH. The new signaling (words with underline) to support the scheme may be introduced in the configuration signaling as below:

NPRACH-ConfigSIB-NB Information Elements

```
--ASN1START
NPRACH-ConfigSIB-NB-r13 : := SEQUENCE {
    nprach-CP-Length-r13              ENUMERATED { us66dot7, us266dot7},
    rsrp-ThresholdsPrachInfoList-r13  RSRP-ThresholdsNPRACH-InfoList-NB-r13   OPTIONAL,
    --Need OR
    nprach ParametersList-r13         NPRACH-ParametersList-NB-r13
}
NPRACH-ConfigSIB-NB-NTN-r17 : :=     SEQUENCE {
```

-continued

```
rsrp-ThresholdsPrachInfoList-NTN-r17 RSRP-ThresholdsNPRACH-InfoList-NB NTN-117
OPTIONAL,
Distance-ThresholdsPrachInfoList-NTN-r17 Distance-ThresholdsPrachInfoList-NTN-r17
OPTIONAL,
--Need OR
nprach-ParametersList-NTN-r17        NPRACH-ParametersList-NB-NTN-r17
}
```

As shown in the above example, the field nprach-Param-etersList-NTN-r17 may configure NPRACH parameters. Up to N*2 PRACH parameters may be configured in nprach-ParametersList field in a cell. Each NPRACH parameters may be associated with a different number of NPRACH repetitions.

With this solution, even if the terminal devices 110-3 and 110-4 have the same RSRP and different pathloss change trend, the repetition number for preamble transmission and the maximum number of repetitions for NPDCCH common search space (CSS) for Msg2, Msg3 retransmissions and Msg4 can be different.

In another example embodiment, the second device 120 may configure up to N NPRACH parameter configurations which are mapped to N cell coverage level in a cell. In each parameter configuration, 2 repetition values are specified for repeating, for example, a basic random access preamble. Take the change trend of pathloss as the example, the new signaling (words with underline) to support the scheme may be introduced in the configuration signalling as below:

first device 110 with pathloss decrease when the second device 120 is moving (i.e., numRepetitionsPerPreambleAt-tempt_pathlossdecrease and npdcch-NumRepetitions-RA-pathlossdecrease Meanwhile, information of subcarrier range (i.e., prach-Subcarrierpathloss-RangeStart-NTN-r17, as shown in the above example) may be included in the message transmitted from the second device 120 to the first device 110, so as to indicate the allowed frequency resources for, for example, a preamble transmission corresponding to different change trend of pathloss/RSPR of the first device 110 (i.e, the different repetition number). That is, the sub-carrier range may include a set of frequency resources for transmission. Each frequency resource in the set of fre-quency resource may include the information associated with the movement direction. As such, the first device 110 may select and use a subcarrier in the range to transmit the preamble to implicitly inform the second device 120 on the selected repetition number.

Alternatively, the 2 repetition values may be indicated via scale factor which map to different movement directions

```
NPRACH Parameters-NB-NTN-r17: :=  SEQUENCE{
   nprach Periodicity NTN 117                ENUMERATED {ms40, ms80, ms160, ms240;
                                                ms320, ms640, ms1280, ms2560 },
   nprach StartTime NTN 117                  ENUMERATED (ms8, ms16, ms32, ms64,
                                                ms128, ms256, ms512, ms1024 } ,
   nprach Subcarrieroffset NTN 117     ENUMERATED {n0, n12, n24, n36, n2, n18, n34;
sparel),
   nprach-NumSubcarriers-NTN-117             ENUMERATED {n12, n24, n36, n48 },
   nprach SubcarrierMSG3 RangeStart NTN 117 ENUMERATED { zero, oneThird, twoThird, one },
   maxNumPreambleAttemptCE NTN 117           ENUMERATED In3, n4, n5, n6, n7, n8, n10;
sparel },
   n
   numRepetitions-per-PreambleAttemps-NTN-r17   ENUMERATED (n1, n2, n4, n8, n16, n32, n64;
   n128;
      numRepetitionsPerPreambleAttempt pathlossincrease-NTN-r17   ENUMERATED {n1, n2, n4,g n8, n16,
   n32, n64, n128},
   numRepetitionsPerPreambleAttempt pathlossdecrease-NTN-r17   ENUMERATED (n1, n2, n4, n8, n16,
   n32, n64, n128},
   prach-Subcarrierpathloss-RangeStart--NTN-r17                 ENUMERATED {zero, X, one},
   npdcch-NumRepetitions-RA-NTN-r17         ENUMERATED (r1, r2, r4, r8, r16, r32, r64, r128;
                                                r256, r512, r1024, r2048,
                                                spare4, spare3, spare2, spare1},
   npdcch-NumRepetitions-RA-pathlossincrease-NTN-r17          ENUMERATED {r1, r2, r4, r8, r16,
   r32, r64, 1128,
                                             r256, r512, r1024, r2048,
   npdcch-NumRepetitions-RA-pathlossdecrease-NTN-r17          ENUMERATED {r1, r2, r4, r8,
   r16, r32, r64, r128,
                                             r256, r512, r1024, r2048,
                                             spare4, spare3, spare2, spare1},
                                             spare4, spare3, spare2, spare1},
   npdcch-StartSF-CSS-RA-r13                ENUMERATED {v1dot5, v2, v4, v8, v16, v32, v48, v64},
   npdcch-Offset-RA-r13                     ENUMERATED  {zero,  oneEighth,  oneFourth,
threeEighth}
}
```

As shown in the above example, for the 2 repetition value, one is for the first device 110 with pathloss increase when the second device 120 is moving (i.e., numRepetitionsPer-PreambleAttempt_pathlossincrease and npdcch-NumRepe-titions-RA-pathlossincrease), and the other one is for the (e.g., two enumeration factors are mapped to an increase/a decrease of the change trend or elevation angle which will be elaborated more in the following part).

Now, returning back to FIG. 4, after receiving 405 the set of parameter configurations, the first device 110 may select the repetition number for transmission between the first device 110 and the second device 120. In this case, the repetition number may be selected based on at least one of the information associated with the movement direction, the set of parameter configurations, and/or a coverage level of the first device 110 in a cell served by the second device 120. In the following part, some more details examples will be introduced so as to illustrate the method of how the repetition number may be selected.

In some embodiments, the first device 110 may measure 407 a RSRP of reference signal received from the second device 120. Then, in such embodiments, the first device 110 may select 408 the coverage level of the first device 110 in a cell based on the measured RSRP and the rsrp-ThresholdsPrachInfoList included in the example configuration shown above. For example, the first device 110 may compare the measured RSRP with a plurality of RSRP thresholds. In the example, if there are 2 RSRP thresholds (threshold values A and B, where threshold value A<threshold value B), then the first device 110 may determine whether the measured RSRP is (1) below threshold value A, (2) equal to or above threshold value A and below threshold value B, or (3) equal to or above threshold value B. Then, each of the three ranges has a corresponding coverage level. As such, a corresponding coverage level may be determined based on the measured RSRP and the plurality of RSRP thresholds.

In some other embodiments, the first device 110 may determine (or measure) the distance between the first device 110 and the second device 120. In such embodiments, the first device 110 may select the coverage level of the first device 110 based on the distance and Distance-ThresholdsPrachInfoList included in the example configuration shown above. Alternatively, the coverage level may also be determined based on both the measured RSRP and the distance between the first device 110 and the second device 120.

In some embodiments, meanwhile, the first device 110 may determine 410 the information associated with the movement direction of the second device 120 relative to the first device 110.

In some examples, as mentioned above the information associated with the movement direction of the second device 120 relative to the first device 110 may be the change trend of pathloss between the first device 110 and the second device 120 or the change trend of RSRP of a signal received from the second device 120. The change trend may be, for example, an increase of pathloss, a decrease of pathloss, or the like. Alternatively, the change trend may be an increase of pathloss, a decrease of pathloss or flat.

The flat used herein means the radio frequency condition is not only changed in the particular direction which is as shown in FIG. 2C mentioned above. In such case, the second device 120 may firstly become closer to the first device 110 and then become farther after that. For such case, the second device 120 may select the same configuration as a pure decrease case, which will re-use parameter configuration of the decrease case. That is, the flat can mean that the second device 120 is moving but the relative location of the second device 120 to the first device 110 is not changed during a certain time.

In other embodiments, the first device 110 and the second device 120 may select different parameter configurations for flat case, without re-using parameter configuration of decrease case. In such embodiments, for example, the second device 120 may configure up to N*3 parameter configurations (including repetition number) which are mapped to N cell coverage level and the three change trends of pathloss/RSRP of the first device 110 in a cell. In another example, the second device 120 may configure up to N NPRACH parameter configurations which are mapped to N cell coverage level in a cell. In this example, each parameters configuration may include a corresponding repetition number. The first device 110 with different coverage level and change trend of, for example, the pathloss/RSRP will select the corresponding parameters for transmission (e.g., for transmitting the preamble, Msg 2, Msg 3 retransmission or Msg 4) using the corresponding repetition number. In such example, 3 repetition values are specified for repeating a basic random access preamble, one for the first device 110 with pathloss/RSPR increase when the second device 120 is moving toward to the first device 110, one for the first device 110 with pathloss/RSPR decrease when the second device 120 is moving away from the first device 110, and one for the first device 110 not purely increase or decrease pathloss/RSRP according to the second device 120's moving path. Alternatively, 3 repetition values may be indicated via scale factors which map to different change trends of the second device 120 (e.g., three Enumeration factors mapping to increase/decrease/flat).

It should be appreciated that, the change trend may also be an increase of RSRP, a decrease of RSRP, and the like. The change trend may also be a change trend of RSRQ, SINR, elevation angle, distance, Doppler shift, and the like. The scope of the present disclosure is not limited in this regard.

In such examples, in order to determine the change trend, the first device 110 may obtain the location of the first device 110. Further, the first device 110 may also receive information related to the location of the second device 120 from the second device 120. For example, the information related to the location of the second device 120 may be ephemeris information or the location information of the second device 120. An ephemeris may be represented in orbital elements format or instant state vector format.

Accordingly, the first device 110 may determine the change trend based on the location of the first device 110 and the information related to the location of the second device 120.

Alternatively, the first device 110 may determine the change trend based on the measurement of the signal transmitted from the second device 120.

Alternatively, as mentioned above, the information associated with the movement direction of the second device 120 relative to the first device 110 may also be an elevation angle between the first device 110 and the second device 120. For example, the first device 110 may measure the elevation angle, which is in the range of {−90°, 90°}. That is, the elevation angle may be an angle with positive value, an angle with negative value, or may be flat (i.e., the value becomes from positive to zero and then becomes negative). In such example, the first device 110 may obtain the location of the first device 110 and receive information related to the location of the second device 120 from the second device 120. Then, in one example, the first device 110 may determine the elevation angle based on the obtained location of the first device 110 and the information related to the location of the second device 120 (e.g., the ephemeris information or the location of the second device 120). In another example, the first device 110 may determine the elevation angle based on the measurement of arrival angle.

Now, returning back to FIG. 4, in some embodiments, after selecting both the coverage level and determining the information associated with the movement direction of the second device 120 relative to the first device 110 (e.g., the change trend or the elevation angle), the first device 110 may select 415, from the set of parameter configurations, one parameter configuration including the parameters for transmission and the corresponding repetition number for transmission (e.g., a PRACH preamble transmission, Msg 2, Msg retransmission and/or Msg 4 transmission) based on the determined coverage level and the information associated with the movement direction. The selected parameter configuration may include corresponding information associated with the movement direction (e.g., a change trend of the pathloss) of the second device 120 relative to the first device 110, as mentioned above when introducing how the second device 120 may configure the parameter configuration.

In some embodiments, the first device 110 may receive, from the second device 120, a set of parameter configurations. Each of the parameter configurations includes a coverage level and information of whether the coverage level is related to the information associated with the movement direction and the information associated with the movement direction and the repetition number for transmission. The first device 110 may determine whether the determined coverage level is related to the information associated with the movement direction. If it is determined that the coverage level is related to the information associated with the movement direction, the first device 110 may select the repetition number for the transmission between the first device and the second device based on the information associated with the movement direction, the set of parameter configurations and the coverage level of the first device in the cell served by the second device.

In an example embodiment, the information associated with the movement direction of the second device 120 relative to the first device 110 (e.g., the change trend of pathloss/RSRP) may be applied to only part of coverage levels (e.g., M of N cell coverage level will have change trend indictor, where M<N). For example, there may be M coverage levels selected and the one who is with high coverage level and worse channel condition as well as requires a high number of repetitions. Accordingly, the second device 120 may configure up to M*2 (or M*3) parameter configurations (including repetition number) which are mapped to M coverage level of a cell and the two (or three) change trends of pathloss/RSRP of the first device 110 in the cell. The rest coverage levels (e.g., N–M) will keep the same as in the conventional solution, that is, without introducing the information associated with the movement direction (e.g., the change trend) since the required repetition number of these coverage levels are quite low which is with worse channel condition and requires low number of repetitions.

Now, returning back to FIG. 4, the first device 110 transmits 420, to the second device 120, the information associated with the movement direction of the second device 120 relative to the first device 110. In such case, the first device 110 may perform a transmission of the information in the Msg1 (e.g., a preamble transmission) via the selected PRACH parameters based on the coverage level and the change trend of pathloss/RSRP or elevation angle. Then, when the second device 120 receives 430 the information, the second device 120 determines 435 the repetition number for transmission between the first device 110 and the second device 120 based on this information. For the case of the received signal between the first device 110 and the second device 120 becomes stronger e.g., the pathloss between the first device 110 and the second device 120 becomes smaller, the distance between the first service 110 and the second device 120 smaller, the RSRP of a signal received from the second device 120 becomes larger, the RSRQ of a signal received from the second device 120 becomes larger, the SINR of a signal received from the second device 120 becomes larger, the elevation angle between the first device 110 and the second device 120 becomes larger, the doppler shift is positive, the elevation angle between the first device 110 and the second device 120 is positive, aggressive repetition number can be determined to optimize the resource usage of the network and reduce the transmission time as well as the power consumption for the first device 110. For the case of the received signal between the first device 110 and the second device 120 becomes worse e.g., the pathloss between the first device 110 and the second device 120 becomes larger, the distance between the first device 110 and the second device 120 larger, the RSRP of a signal received from the second device 120 becomes smaller, the RSRQ of a signal received from the second device 120 becomes smaller, the SINR of a signal received from the second device 120 becomes smaller, the elevation angle between the first device 110 and the second device 120 becomes smaller, the doppler shift is negative, the elevation angle between the first device 110 and the second device 120 is negative, defensive repetition number can be determined to reduce the failure of the transmission.

Then, in some embodiments, the second device 120 may transmit 440 a Msg 2 (e.g., RAR). In such embodiments, the parameter npdcch-NumRepetitions-RA mentioned above indicates the maximum number of repetitions for NPDCCH common search space (CSS) for the RAR, which is configured based on the coverage level and the change trend of PL/RSRP or elevation angle.

In the following, upon receiving the Msg 2, the first device 110 may transmit a Msg 3. The repetition number may be indicated in the downlink control indicator (DCI) in the Msg 3 by the second device 120 based on the coverage level and the change trend of pathloss/RSRP or elevation angle.

In the following, upon the Msg3 retransmission, the second device 120 may transmit 453 NPDCCH to indicate the Msg3 retransmission resources, In such embodiments, the parameter npdcch-NumRepetitions mentioned above indicates the maximum number of repetitions for NPDCCH common search space (CSS) for the PDCCH, which is configured based on the coverage level and the change trend of PL/RSRP or elevation angle. In such case, the first device 110 may retransmit 455 the Msg 3.

Further, in some embodiments, upon receiving 450 the Msg 3, the second device 120 may transmit 460 a Msg 4. In such embodiment, the second device 120 may configure npdcch-NumRepetitions based on the coverage level and the change trend of PL/RSRP or elevation angle.

Further, in some embodiments, upon receiving the Msg 4, the first device 110 may transmit 470 Msg5 and the following data transmission between the first device 110 and the second device 120 may perform transmission with the repetition number indicated in the DCI by the second device 120 based on the coverage level and the change trend of PL/RSRP or elevation angle. As a result, the resource usage of the network can be optimized and the transmission time as well as the power consumption for the first device 110 can be reduced or the data transmission failure can be reduced.

In some embodiments, the first device 110 may also indicate the information associated with the movement direction of the second device 120 relative to the first device 110 (e.g., the change trend of pathloss) in Msg3. For such embodiments, FIG. 5 illustrates a signaling flow according to some example embodiments of the present disclosure. For the purpose of discussion, the signaling flow 500 will be described with reference to FIG. 1. The signaling flow 500 involves the first device 110 and the second device 120 as illustrated in FIG. 1.

As in conventional solution, the second device 120 may configure up to N parameter configurations (including repetition number) which are mapped to N cell coverage level. The second device 120 may transmit 502 SIB to the first device 110 as in conventional solution. Up receiving 505 the SIB, the first device 110 may determine 510 the coverage level and corresponding parameter configuration for transmission and transmit 520 Msg 1 to the second device 120 based on the selected parameter configuration. When the second device 120 receives 530 Msg 1 message, it may transmit 540 Msg 2 message to the first device 110, and the repetition number of the Msg 2 message is aligned with the coverage level selected by preamble (Msg 1), which is the same as in the conventional solution. Further, prior to transmitting Msg 3, the first device 110 may determine 550, for example, the information associated with the movement of the second device 120 relative to the first device 100 (e.g., the change trend of pathloss/RSRP or elevation angle). As such, the first device 110 may transmit 560 Msg 3 to the second device 120, and the Msg 3 message include the determined information, that is the first device 110 may report the change trend of pathloss/RSRP or elevation angle in this Msg 3. It should be appreciated that the information may also be the change trend of RSRQ, SINR or others as mentioned above, and the scope of the present disclosure is not limited in regards. Similarly, the change trends may also include an increase, a decrease, or flat. Alternatively, the change trends may also include an increase or a decrease.

Accordingly, after receiving 570 Msg 3, the second device 120 may transmit 580 Msg4. The message (i.e., the Msg 4) may include the repetition number for transmission (e.g., npdcch-NumRepetitions) which may be configured by the second device 120 based on the coverage level and, for example, the change trend of pathloss/RSRP or elevation angle. As such, the maximum number of repetitions for NPDCCH UE specific search space (USS) or future data transmissions may be transmitted with the number of repetition equal to the npdcch-NumRepetitions. Upon the reception of the Msg 4, the first device 110 may transmit 590 Msg 5 and the following data transmission. In such data transmissions, the repetition number is the one indicated in the DCI by the second device 120 considering both the coverage level and the change trend of path loss/RSRP or elevation angle. As a result, the following data transmissions between the first device 110 and the second device 120 may be performed with repetition which was determined based on the information associated with the movement direction of the second device 120 relative to the first device 110 (e.g., the change trend of pathloss/elevation angle) and the coverage level.

With the above solution, the number of repetition number for data transmission is determined based on the coverage level and the change trend of pathloss/RSRP or elevation angle, and the like, thereby optimizing the resource usage of the network and reducing the transmission time as well as the power consumption for the first device 110 or reducing the failure of the transmission.

Figure 5:
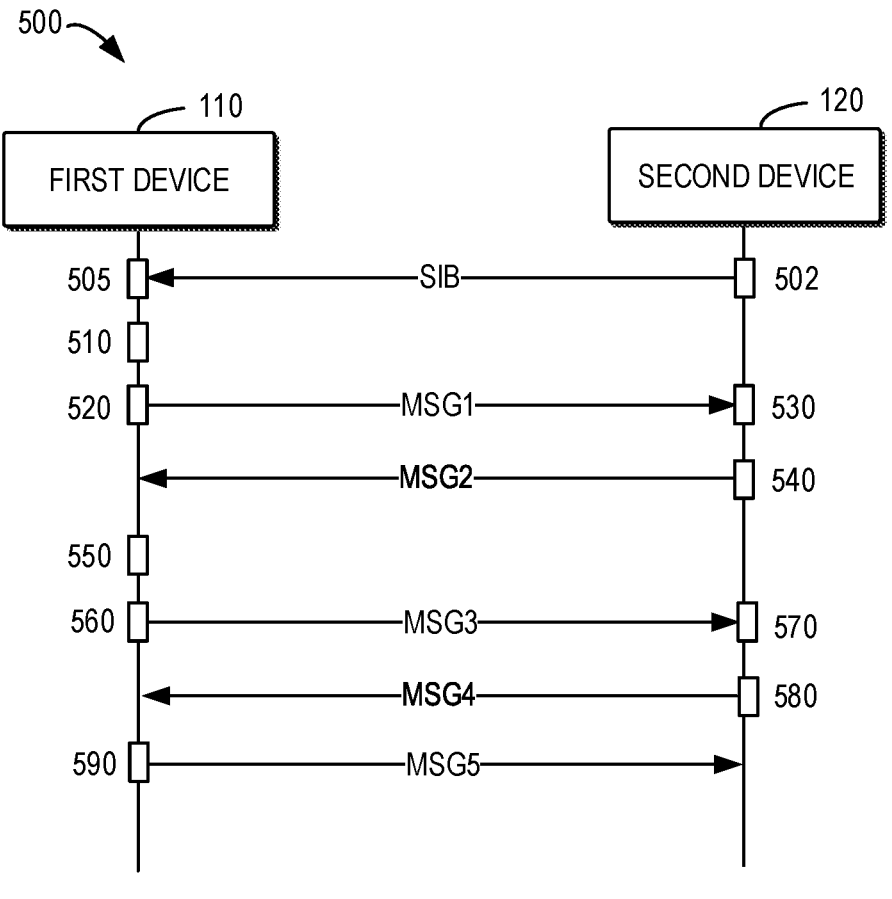
FIG. 5 illustrates a signaling flow according to some example embodiments of the present disclosure.

In the some embodiments, the Msg 3 message, transmitted during the above process shown in FIG. 5, may be transmitted via a radio resource control (RRC) message or a medium access control-control element (MAC-CE) message.

In some embodiments, during following uplink data transmissions, the first device 110 may update the change trend of pathloss/RSRP or elevation angle to the second device 120 via MAC CE of the PUSCH. In such embodiments, for example, if the first device 110 determines that there is an update of the information associated with the movement direction (such as the change trend of pathloss/RSRP or elevation angle), the first device 110 may transmit the updated the information associated with the movement direction to the second device 120. As such, the second device 120 may determine the repetition number for future transmission based on the received information such as change trend of pathloss/RSRP or elevation angle of the second device 120, thereby optimizing the resource usage of the network and reducing the transmission time as well as the power consumption for the first device 110 or reducing the failure of the transmission.

In some embodiments, during a preamble transmission procedure of NB-IoT first device 110 in NTN, after the first device 110 transmits the preamble with repetition. If the preamble transmission was not successful, that is, the associated random access response (RAR) message was not received, based on a power of receiving signal (e.g., RSRP) from the second device 120 or a distance between the first device 110 and the second device 120, the first device 110 may determine, a current coverage level of the first device 110 in a cell served by the second device 120. Then, if it is determined that there is a change of the coverage level, the first device 110 may select NPRACH parameter and a repetition number for transmission based on the current coverage level and the information associated with the movement direction and the coverage level. In the following part, this process will be introduced in detail with reference to FIG. 6.

Figure 6:
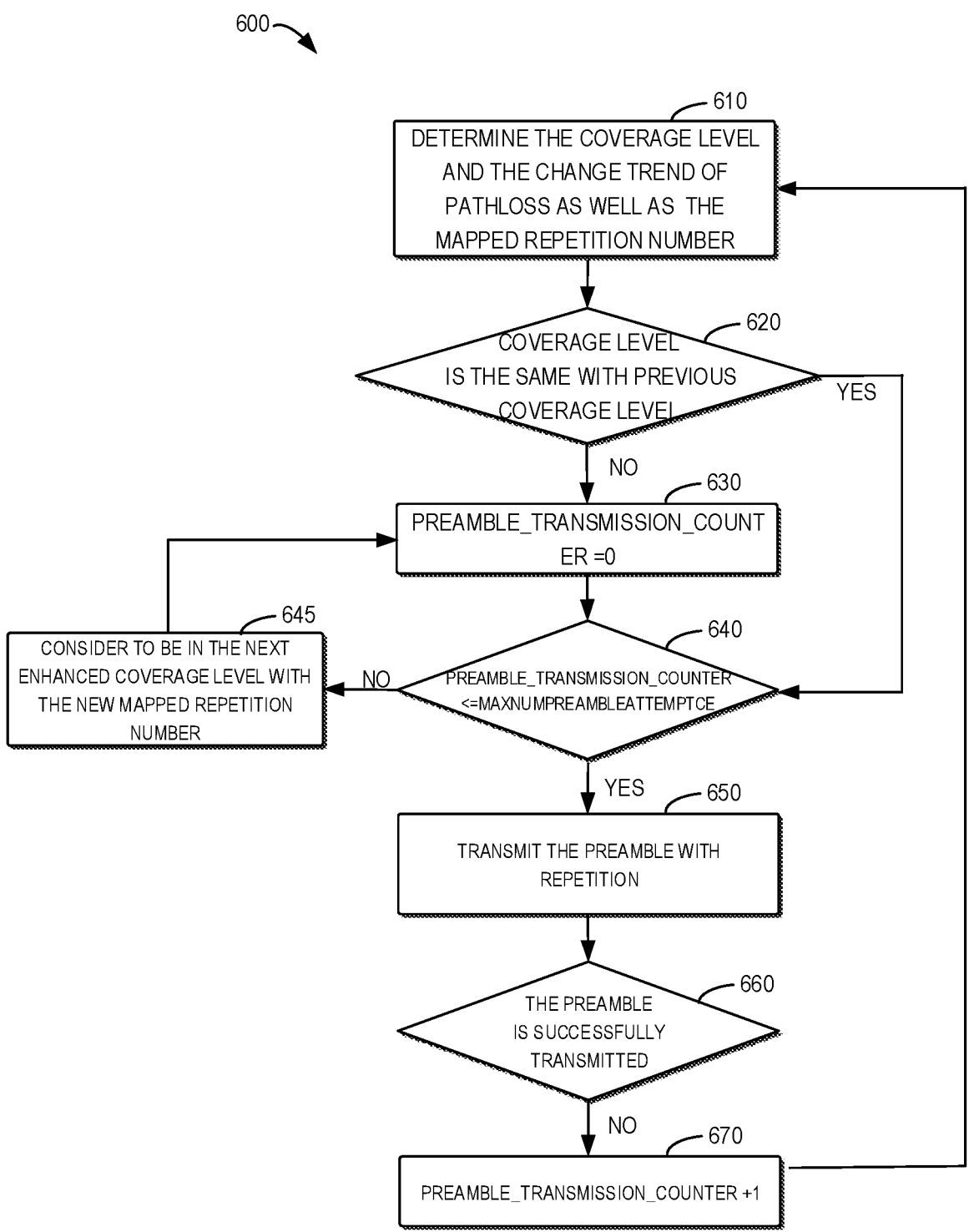
FIG. 6 illustrates a flowchart of a process implemented at a first device according to some example embodiments of the present disclosure.

FIG. 6 illustrates a flowchart of a process implemented at a first device 110 according to some example embodiments of the present disclosure. For the purpose of discussion, the flow 600 will be described with reference to FIG. 1. The signaling flow 600 involves the first device 110 and the second device 120 as illustrated in FIG. 1.

As shown in FIG. 6, at block 610, the first device 110 determines the coverage level and change trend of path loss as well as the mapped repetition number for transmission. Since the methods of determining the coverage level and change trend of path loss and corresponding repetition number has been introduced when introducing FIGS. 4 and 5, the methods thereof will not be repeated herein. Then, at block 620, the first device 110 will determine whether the coverage level is the same with the previous coverage level. If not, at block 630, the first device 110 will start a preamble_transmission_counter, counting from zero and increase in each round. Then, at block 640, the first device 110 will check whether the counter preamble_transmission_counter has reached MAX_NUM_PREAMBLE_AT-TEMPT_CE, that is whether the following formula (1) is satisfied:

$$PREAMBLE\_TRANSMISSION\_COUNTER <= maxNumPreamble\ AttemptCE. \qquad (1)$$

where, maxNumPreambleAttemptCE is the maximum number of preamble attempts for coverage enhancement and it depends on the coverage level. If the first device 110 determines that the above formula is satisfied, at block 650, the first device 110 will transmit the preamble with repetition. If it is determined that the above formula is not satisfied (i.e., maxNumPreambleAttemptCE is reached without success of the PRACH preamble transmission), the first device 110 may consider to be in the next enhanced coverage level with the new mapped repetition number, if the next coverage level is configured. Otherwise, if it is determined that the above formula is satisfied, the first device 110 will determine at block 660 whether the preamble transmission is successful (e.g., by determining whether the associated random access response (RAR) message was received)). Once it is determined that the preamble is successfully transmitted (not shown), there will not be any further preamble retransmission and the second device 120 will respond with a Msg 2. Once it is determined that the preamble is not successfully transmitted, at block 670, the first device 110 will increase the counter PREAMBLE_TRANSMISSION_COUNTER by 1, and then go back to block 610 so as to determine the coverage level, change tend of the pathloss, and the corresponding repetition number, again. That is, once the preamble is not successfully transmitted, the first device 110 will update the cell coverage level based on the latest measurement. If the coverage level keep unchanged (i.e., the coverage level is the same with the previous coverage level), the first device 110 will transmit preamble with the PRACH resources and repetition number configured for the previous coverage level, and this is done up to a maximum number (i.e., maxNumPreambleAttemptCE). If the coverage level is changed (i.e., the coverage level is not the same with the previous coverage level), the first device 110 will transmit the preamble with the new PRACH resources and repetition number corresponding to the new determined coverage level. Accordingly, as shown in FIG. 6, the process will go to block 630 and start the counter (i.e., PREAMBLE_ TRANSMISSION_COUNTER) from zero again. As a result, the repetition number may be updated with the update of coverage level and, for example, the change trend of the pathloss, such that the resource usage of network can be optimized and the transmission time as well as the power consumption for the first device 110 is reduced.

FIG. 7 shows a flowchart of an example method 700 implemented at a first device 110 according to some example embodiments of the present disclosure. For the purpose of discussion, the method 700 will be described from the perspective of the first device 110 with respect to FIG. 1.

At block 710, the first device 110 determines information associated with a movement direction of a second device 120 serving the first device relative to the first device. Then, at block 720, the first device performs a transmission of the information to the second device.

In some embodiments, the method 700 further comprises receiving, from the second device, a system information block a set of parameter configurations, each of the parameter configurations comprising corresponding information associated with the movement direction and a repetition number for transmission, and selecting a repetition number for the transmission between the first device and the second device based on the information associated with the movement direction, the set of parameter configurations and a coverage level of the first device in a cell served by the second device.

In some embodiments, the transmission is performed at a random access procedure and the transmission is at least one of: a preamble transmission; a message 2 transmission; a message 3 retransmission; a message 4 transmission; a message 3 transmission; or a message 5 transmission.

In some embodiments, the corresponding information associated with the movement direction comprises at least one of: a repetition number corresponding to one movement direction of the second device relative to the first device, a group of repetition numbers, each repetition number of the group of repetition numbers corresponding to a movement direction, or a group of scale factors, each scale factor of the group of scale factors relating to a particular movement direction.

In some embodiments, the method 700 further comprises selecting a coverage level for the first device in a cell served by the second device; and selecting a set of parameters and a repetition number for transmission based on the information associated with the movement direction and the coverage level.

In some embodiments, the method 700 further comprises receiving, from the second device, a set of threshold values related to a distance between the first device and the second device associated with a plurality of coverage levels; and selecting the coverage level for the first device comprises: selecting, from the plurality of coverage levels, the coverage level of the first device in a cell served by the second device based on a distance between the first device and the second device, the set of threshold values related to the distance.

In some embodiments, determining the information associated with the movement direction comprises: receiving, from the second device, a set of parameter configurations, each of the parameter configurations comprising a coverage level and information of whether the coverage level is related to the information associated with the movement direction and the information associated with the movement direction and the repetition number for transmission; determining a coverage level of the first device in a cell served by the second device; determining whether the determined coverage level is related to the information of whether the coverage level is related to the information associated with the movement direction; and in accordance with a determination that the coverage level is related to the information associated with the movement direction, selecting the repetition number for the transmission between the first device and the second device based on the information associated with the movement direction, the set of parameter configurations and the coverage level of the first device in the cell served by the second device.

In some embodiments, the method 700 further comprises in response to a failure of transmission with repetition of a Message 1 at a random access procedure to the second device, determining, based on at least one of a power of receiving signal from the second device and a distance between the first device and the second device, a current coverage level of the first device in a cell served by the second device; in response to a change of the coverage level, determining a set of parameters and a repetition number for transmission based on the current coverage level and the information associated with the movement direction and the coverage level; and retransmit the Message 1 based on the determined set of parameters and the repetition number.

In some embodiments, the information associated with the movement direction comprises a change trend of at least one of the following during: the change trend of a path loss between the first device and the second device, the change trend of a reference signal received power, RSRP, of a signal received from the second device, the change trend of a distance between the first device and the second device, the change trend of an elevation angle between the first device and the second device, the change trend of a signal-to-interference-plus-noise ratio, SINR, of a signal received from the second device, the change trend of a reference signal received quality, RSRQ of a signal received from the second device, or the change trend of a Doppler shift of a signal received from the second device.

In some embodiments, determining the information comprises: obtaining a location of the first device; receiving information related to a location of the second device from the second device; and determining the change trend based on the location and the information related to the location of the second device.

In some embodiments, the change trend comprises at least one of: an increase, a decrease, or flat.

In some embodiments, the information associated with the movement direction comprises an elevation angle between the first device and the second device.

In some embodiments, determining the information associated with the movement direction comprises: obtaining a location of the first device; receiving information related to a location of the second device from the second device; and determining the elevation angle based on a location of the first device and the information related to the location of the second device.

In some embodiments, determining the information associated with the movement direction comprises: determining the elevation angle based on an arrival angle determined by the first device based on a measurement.

In some embodiments, the elevation angle is at least one of: positive, negative, or flat.

In some embodiments, the method 700 further comprises receiving, from the second device, information of a subcarrier range comprising a set of frequency resources for transmission, each of the frequency resources comprising the information associated with the movement direction.

In some embodiments, the method 700 further comprises in accordance with a determination that there is an update of the information associated with the movement direction, transmitting the updated information associated with the movement direction to the second device.

In some embodiments, the information associated with the movement direction to the second device is transmitted in a preamble or a message 3 at a random access procedure.

In some embodiments, the message 3 is transmitted via a radio resource control, RRC, message or a medium access control-control element, MAC-CE.

FIG. 8 shows a flowchart of an example method 800 implemented at a second device in accordance with some example embodiments of the present disclosure. For the purpose of discussion, the method 800 will be described from the perspective of the second device 110 with respect to FIG. 1.

At block 810, the second device 110 receives, from a first device, information associated with a movement direction of the second device serving the first device relative to the first device. At block 820, the second device 110 determines a repetition number for transmission between the first device and the second device based on the information associated with the movement direction.

In some example embodiments, the method 800 further comprises transmitting, to the first device, a system information block a set of parameter configurations, each of the parameter configurations comprising a corresponding information associated with the movement direction and a repetition number for transmission.

In some example embodiments, the corresponding information associated with the movement direction comprises at least one of: a repetition number corresponding to one movement direction of the second device relative to the first device, a group of repetition numbers, each repetition number of the group of repetition numbers corresponding to a movement direction, or a group of scale factors, each scale factor of the group of scale factors relating to a particular movement direction.

In some example embodiments, the method 800 further comprises transmitting, to the first device, a set threshold values of distance between the first device and the second device associated with a plurality of coverage levels.

In some example embodiments, the method 800 further comprises transmitting, to the first device, a set of parameter configurations, each of the parameter configurations comprising a coverage level and information of whether the coverage level is related to the information associated with the movement direction and the information associated with the movement direction and the repetition number for transmission.

In some example embodiments, the information associated with the movement direction comprises a change trend of at least one of the following: the change trend of a path loss between the first device and the second device, the change trend of a reference signal received power, RSRP, of a signal received from the second device, the change trend of a distance between the first device and the second device, the change trend of an elevation angle between the first device and the second device, the change trend of a signal-to-interference-plus-noise ratio, SINR, of a signal received from the second device, the change trend of a reference signal received quality, RSRQ of a signal received from the second device, or the change trend of a Doppler shift of a signal received from the second device.

In some example embodiments, the method 800 further comprises transmitting information related to a location of the second device to the first device.

In some example embodiments, the change trend comprises at least one of: an increase, a decrease, or flat.

In some example embodiments, the information associated with the movement direction comprises an elevation angle between the first device and the second device.

In some example embodiments, the method 800 further comprises transmitting information related to a location of the second device to the first device.

In some example embodiments, the elevation angle is at least one of: positive, negative, or flat.

In some example embodiments, the method 800 further comprises transmitting, to the first device, information of a subcarrier range comprising a set of frequency resources for transmission, each of the frequency resources comprising the information associated with the movement direction.

In some example embodiments, the method 800 further comprises receiving, from the first device, updated information associated with the movement direction from the first device; and determining the repetition number for transmission between the first device and the second device based on the updated information.

In some example embodiments, the information associated with the movement direction to the second device is transmitted in a preamble or a message 3 at a random access procedure.

In some example embodiments, the message 3 is transmitted via a radio resource control, RRC, message or a medium access control-control element, MAC-CE.

In some embodiments, a first apparatus capable of performing any of the methods 300, 400, 500, 600, and 700 (for example, the first device 110) may comprise means for performing the respective steps of the methods. The means may be implemented in any suitable form. For example, the means may be implemented in a circuitry or software module.

In some embodiments, the first apparatus comprises means for determine information associated with a movement direction of a second device serving the first device relative to the first device; and means for performing a transmission of the information to the second device.

In some embodiments, the first apparatus further comprises means for receiving, from the second device, a system information block a set of parameter configurations, each of the parameter configurations comprising corresponding information associated with the movement direction and a repetition number for transmission, and means for selecting a repetition number for the transmission between the first device and the second device based on the information associated with the movement direction, the set of parameter configurations and a coverage level of the first device in a cell served by the second device.

In some embodiments, the transmission is performed at a random access procedure and the transmission is at least one of: a preamble transmission; a message 2 transmission; a message 3 retransmission; a message 4 transmission; a message 3 transmission; or a message 5 transmission.

In some embodiments, the corresponding information associated with the movement direction comprises at least one of: a repetition number corresponding to one movement direction of the second device relative to the first device, a group of repetition numbers, each repetition number of the group of repetition numbers corresponding to a movement direction, or a group of scale factors, each scale factor of the group of scale factors relating to a particular movement direction.

In some embodiments, the first apparatus further comprises means for selecting a coverage level for the first device in a cell served by the second device; and means for selecting a set of parameters and a repetition number for transmission based on the information associated with the movement direction and the coverage level.

In some embodiments, the first apparatus further comprises means for receiving, from the second device, a set of threshold values related to a distance between the first device and the second device associated with a plurality of coverage levels; and means for selecting the coverage level for the first device comprises: means for selecting, from the plurality of coverage levels, the coverage level of the first device in a cell served by the second device based on a distance between the first device and the second device, the set of threshold values related to the distance.

In some embodiments, means for determining the information associated with the movement direction comprises: means for receiving, from the second device, a set of parameter configurations, each of the parameter configurations comprising a coverage level and information of whether the coverage level is related to the information associated with the movement direction and the information associated with the movement direction and the repetition number for transmission; means for determining a coverage level of the first device in a cell served by the second device; means for determining whether the determined coverage level is related to the information of whether the coverage level is related to the information associated with the movement direction; and means for in accordance with a determination that the coverage level is related to the information associated with the movement direction, selecting the repetition number for the transmission between the first device and the second device based on the information associated with the movement direction, the set of parameter configurations and the coverage level of the first device in the cell served by the second device.

In some embodiments, the first apparatus further comprises means for in response to a failure of transmission with repetition of a Message 1 at a random access procedure to the second device, determining, based on at least one of a power of receiving signal from the second device and a distance between the first device and the second device, a current coverage level of the first device in a cell served by the second device; means for in response to a change of the coverage level, determining a set of parameters and a repetition number for transmission based on the current coverage level and the information associated with the movement direction and the coverage level; and means for retransmit the Message 1 based on the determined set of parameters and the repetition number.

In some embodiments, the information associated with the movement direction comprises a change trend of at least one of the following: the change trend of a path loss between the first device and the second device, the change trend of a reference signal received power, RSRP, of a signal received from the second device, the change trend of a distance between the first device and the second device, the change trend of an elevation angle between the first device and the second device, the change trend of a signal-to-interference-plus-noise ratio, SINR, of a signal received from the second device, the change trend of a reference signal received quality, RSRQ of a signal received from the second device, or the change trend of a Doppler shift of a signal received from the second device.

In some embodiments, means for determining the information comprises: means for obtaining a location of the first device; means for receiving information related to a location of the second device from the second device; and means for determining the change trend based on the location and the information related to the location of the second device.

In some embodiments, the change trend comprises at least one of: an increase, a decrease, or flat.

In some embodiments, the information associated with the movement direction comprises an elevation angle between the first device and the second device.

In some embodiments, means for determining the information associated with the movement direction comprises: means for obtaining a location of the first device; means for receiving information related to a location of the second device from the second device; and means for determining the elevation angle based on a location of the first device and the information related to the location of the second device.

In some embodiments, means for determining the information associated with the movement direction comprises: means for determining the elevation angle based on an arrival angle determined by the first device based on a measurement.

In some embodiments, the elevation angle is at least one of: positive, negative, or flat.

In some embodiments, the first apparatus further comprises means for receiving, from the second device, information of a subcarrier range comprising a set of frequency resources for transmission, each of the frequency resources comprising the information associated with the movement direction.

In some embodiments, the first apparatus further comprises means for in accordance with a determination that there is an update of the information associated with the movement direction, transmitting the updated information associated with the movement direction to the second device.

In some embodiments, the information associated with the movement direction to the second device is transmitted in a preamble or a message 3 at a random access procedure.

In some embodiments, the message 3 is transmitted via a radio resource control, RRC, message or a medium access control-control element, MAC-CE.

In some embodiments, a second apparatus capable of performing any of the method 800 (for example, the second device 120) may comprise means for performing the respective steps of the method 800. The means may be implemented in any suitable form. For example, the means may be implemented in a circuitry or software module.

In some embodiments, the second apparatus comprises means for receiving, from a first device, information associated with a movement direction of the second device serving the first device relative to the first device; and means for determining a repetition number for transmission between the first device and the second device based on the information associated with the movement direction.

In some embodiments, the second apparatus further comprises means for receiving, at a second device and from a first device, information associated with a movement direction of the second device serving the first device relative to the first device; and means for determining a repetition number for transmission between the first device and the second device based on the information associated with the movement direction.

In some embodiments, the second apparatus further comprises means for transmitting, to the first device, a system information block a set of parameter configurations, each of the parameter configurations comprising a corresponding information associated with the movement direction and a repetition number for transmission.

In some embodiments, the corresponding information associated with the movement direction comprises at least one of: a repetition number corresponding to one movement direction of the second device relative to the first device, a group of repetition numbers, each repetition number of the group of repetition numbers corresponding to a movement direction, or a group of scale factors, each scale factor of the group of scale factors relating to a particular movement direction.

In some embodiments, the second apparatus further comprises means for transmitting, to the first device, a set threshold values of distance between the first device and the second device associated with a plurality of coverage levels.

In some embodiments, the second apparatus further comprises means for transmitting, to the first device, a set of parameter configurations, each of the parameter configurations comprising a coverage level and information of whether the coverage level is related to the information associated with the movement direction and the information associated with the movement direction and the repetition number for transmission.

In some embodiments, the information associated with the movement direction comprises a change trend of at least one of the following: the change trend of a path loss between the first device and the second device, the change trend of a reference signal received power, RSRP, of a signal received from the second device, the change trend of a distance between the first device and the second device, the change trend of an elevation angle between the first device and the second device, the change trend of a signal-to-interference-plus-noise ratio, SINR, of a signal received from the second device, the change trend of a reference signal received quality, RSRQ of a signal received from the second device, or the change trend of a Doppler shift of a signal received from the second device.

In some embodiments, the second apparatus further comprises means for transmitting information related to a location of the second device to the first device.

In some embodiments, the change trend comprises at least one of: an increase, a decrease, or flat.

In some embodiments, the information associated with the movement direction comprises an elevation angle between the first device and the second device.

In some embodiments, the second apparatus further comprises means for transmitting information related to a location of the second device to the first device.

In some embodiments, the elevation angle is at least one of: positive, negative, or flat.

In some embodiments, the second apparatus further comprises means for transmitting, to the first device, information of a subcarrier range comprising a set of frequency resources for transmission, each of the frequency resources comprising the information associated with the movement direction.

In some embodiments, the second apparatus further comprises means for receiving, from the first device, updated information associated with the movement direction from the first device; and means for determining the repetition number for transmission between the first device and the second device based on the updated information.

In some embodiments, the information associated with the movement direction to the second device is transmitted in a preamble or a message 3 at a random access procedure.

In some embodiments, the message 3 is transmitted via a radio resource control, RRC, message or a medium access control-control element, MAC-CE.

Figures 9, 10:
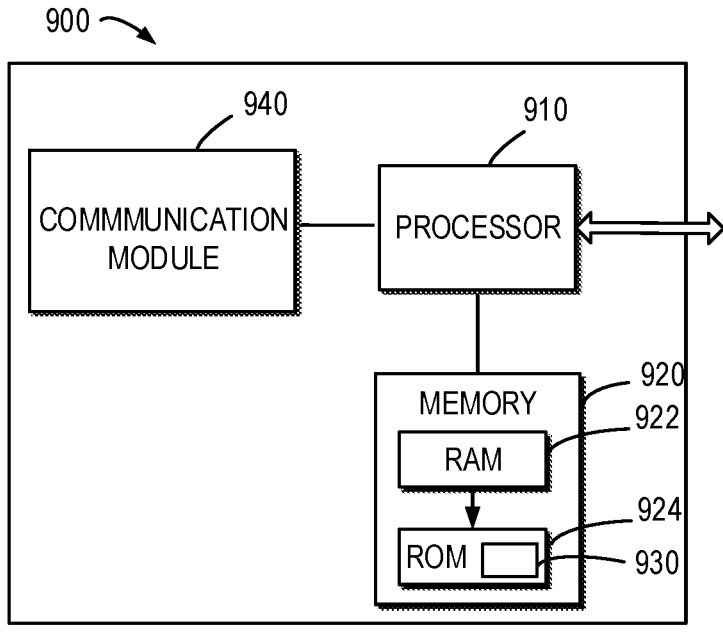
FIG. 9 illustrates a simplified block diagram of a device that is suitable for implementing example embodiments of the present disclosure.
FIG. 10 illustrates a block diagram of an example computer readable medium in accordance with some example embodiments of the present disclosure.

FIG. 9 is a simplified block diagram of a device 900 that is suitable for implementing example embodiments of the present disclosure. The device 900 may be provided to implement a communication device, for example, the first device 110 or the second device 120 as shown in FIG. 1. As shown, the device 900 includes one or more processors 910, one or more memories 920 coupled to the processor 910, and one or more communication modules 940 coupled to the processor 910.

The communication module 940 is for bidirectional communications. The communication module 940 has one or more communication interfaces to facilitate communication with one or more other modules or devices. The communication interfaces may represent any interface that is necessary for communication with other network elements. In some example embodiments, the communication module 940 may include at least one antenna.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the memory, e.g., ROM 924. The processor 910 may perform any suitable actions and processing by loading the program 930 into the RAM 922.

The example embodiments of the present disclosure may be implemented by means of the program 930 so that the device 900 may perform any process of the disclosure as discussed with reference to FIGS. 2 to 8. The example embodiments of the present disclosure may also be implemented by hardware or by a combination of software and hardware.

In some example embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 which may be in form of CD, DVD or other optical storage disk. The computer readable medium has the program 930 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 3 to 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one memory including computer program code;
   wherein the at least one memory and the computer program code are configured to, with the at least one processor, cause the first device to:
      determine information associated with a movement direction of a second device serving the first device relative to the first device;
      perform a transmission of the information to the second device,
         wherein the transmission is performed at a random access procedure and the transmission is at least one of:
         a preamble transmission;
         a message 2 transmission;
         a message 3 retransmission;
         a message 4 transmission;

a message 3 transmission; or a message 5 transmission;

receive, from the second device, a set of threshold values related to a distance between the first device and the second device associated with a plurality of coverage levels;

select the coverage level for the first device by selecting, from the plurality of coverage levels, the coverage level of the first device in a cell served by the second device based on a distance between the first device and the second device, wherein the set of threshold values are related to the distance;

receive, from the second device, a system information block message comprising a set of parameter configurations, each of the parameter configurations comprising corresponding information associated with the movement direction, wherein the information associated with the movement direction comprises:

a group of repetition numbers, each repetition number of the group of repetition numbers corresponding to a movement direction, a group of scale factors, each scale factor of the group of scale factors relating to a particular movement direction, an elevation angle between the first device and the second device, wherein the elevation angle is determined based on an arrival angle determined by the first device based on a measurement, and a change trend of at least one of:

a path loss between the first device and the second device, a reference signal received power (RSRP) of a signal received from the second device, the distance between the first device and the second device, the elevation angle between the first device and the second device, a signal-to-interference-plus-noise ratio (SINR) of a signal received from the second device, a reference signal received quality (RSRQ) of a signal received from the second device, or a Doppler shift of a signal received from the second device;

select a repetition number for the transmission between the first device and the second device based on the information associated with the movement direction, the set of parameter configurations and the coverage level of the first device in the cell served by the second device; and transmit updated information associated with the movement direction to the second device upon determining that there is an update of the information associated with the movement direction.

* * * * *